July 29, 1947.    L. JONES    2,424,694
HAULING DEVICE
Filed July 8, 1944
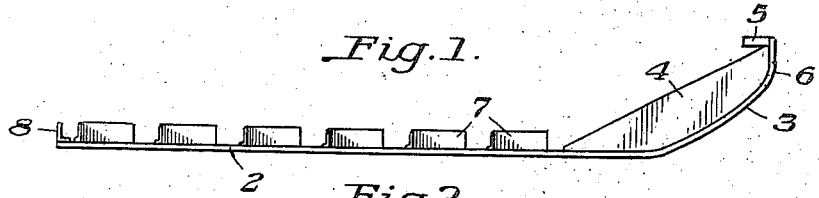
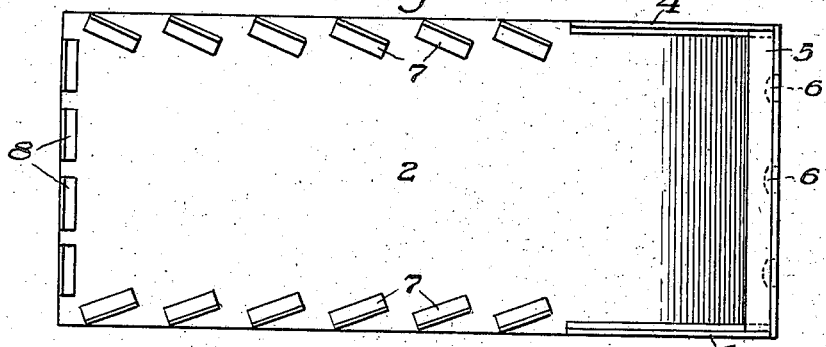
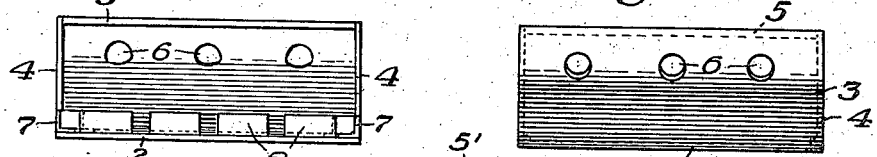
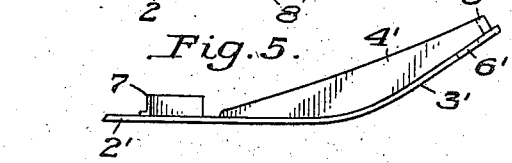
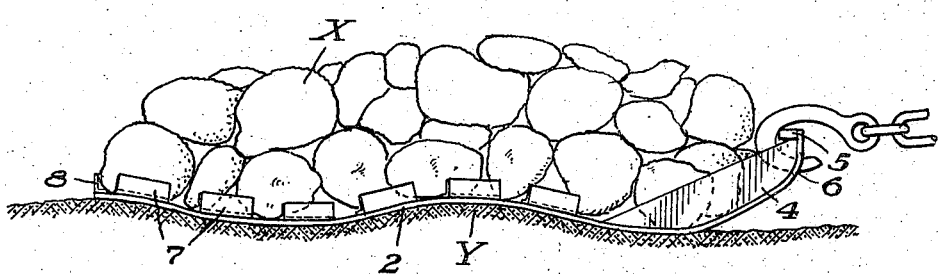
INVENTOR
Lloyd Jones
by his attorney
Christy, Parmelee & Strickland Patented July 29, 1947

2,424,694

UNITED STATES PATENT OFFICE 2,424,694

HAULING DEVICE

Lloyd Jones, North East, Pa., assignor to Margaret S. Jones, North East, Pa.

Application July 8, 1944, Serial No. 544,104

4 Claims. (Cl. 280—19)

This invention is for an improvement in hauling apparatus of the type variously referred to as farm boats, stone boats, land sleds, and similar names, and is for an implement of this kind of inexpensive, rugged and durable construction.

In and about farms, it is frequently desirable to move heavy loads from one place to another, and to avoid as much as possible the lifting of the objects to be moved. Frequently, for example, it is desirable to gather up stones from a field under cultivation and move them to a point of disposal. It is also desirable in many instances to move sacks of fertilizer, lime, seed, or the like, or to move drums or barrels containing various supplies, or to move farm implements from one place to another. A wagon is undesirable because of the need for lifting the objects to be moved up into the bed of the wagon. Consequently farms commonly employ so-called "farm boats" or "stone boats." These are usually made of heavy timber. Sometimes the boards constituting the bed of the sled contact the ground, and have upwardly turned forward ends. In other cases skids or runners are provided on the side of the sled. Where the body constituting the bed of the sled itself engages the ground, the structure has the advantage of being relatively low, but the boards are subject to rapid disintegration due to the fact that the farm boat frequently lies on the ground for long periods of time, creating conditions under the boards favorable for the rotting of the timber, and the boards are also likely to become roughened by being dragged over stones and gravel. Consequently the use of runners is preferred, but since the boat may cross fields in different stages of cultivation, such as plowed land, or seeded land, or cultivated fields, or meadows, marks or impressions are made by the runners, or the runners may sink into the earth or wear furrows in the areas where grass or other crops are growing. Moreover, such wooden structures are rigid and cannot adapt or adjust themselves to contact with surfaces over which they move, and with continued use the timbers loosen and weave, leading to need for frequent repair.

According to the present invention there is provided a stone boat formed of thin sheet material, preferably thin sheet plate or strip metal. The forward end of the metal is turned up and braced so as to ride over obstructions. A discontinuous series of cleats is provided along the edges, other than the front of the sled or boat, these being sufficient to prevent the load from sliding off the boat. Being discontinuous, however, they do not interfere with the flexibility of the material. Hence as the boat is dragged with a load over the ground, it can bend or warp or flex within reasonable limits to adjust itself to the contour of the surface of the ground. The ability of the farm boat of the present invention to adapt itself to uneven surfaces of the ground enables it to carry heavy loads with a minimum of destructive stresses to the farm boat itself, and with a minimum destruction or marring of the fields or roads over which it is moved. Also the overall vertical height of the structure is very inconsiderable, so that heavy objects can be loaded onto it or removed from it with the least possible effort. While the invention is described herein primarily as a farm boat, it may be designed and used for various purposes where a flexible hauling device of this character is desired.

The whole boat may be cheaply constructed. It is itself relatively light so that it is not cumbersome to move or to store away.

The invention may be more fully understood by reference to the accompanying drawings, in which:

Fig. 1 is a side elevation of a farm boat embodying my invention;

Fig. 2 is a top plan view thereof;

Fig. 3 is an end elevation looking at the rear end of the boat;

Fig. 4 is an end elevation looking at the front end;

Fig. 5 is a fragmentary side elevation showing a slightly modified front end construction; and Fig. 6 is a side elevation showing the boat loaded and indicating the manner in which it adapts itself to the uneven contour of the ground over which it may move.

As shown in the drawings, the body of the boat is formed from integral lengths of material of appropriate width. The material employed is preferably, but not of necessity, ferrous, and may for example be strip steel, or light steel plate. This body or plate is designated generally as 2, and the forward end thereof is curved upwardly at 3. Gusset plates 4 are welded along each side edge of the curved front portion of the body to permanently keep the front part of the strip turned upwardly. A reinforcing strip 5 may be welded or otherwise secured across the upturned front edge, to better resist deforming of the sled when it is being dragged with a heavy load on it. The upturned front end portion is provided with one or more, preferably several holes 6, through which hooks, chains, or other rigging for dragging the boat may pass and be fastened.

Back of the gusset plates 4 along each edge of the stone boat are a series of spaced cleats 7 which are preferably set at a slight angle near the edge, and which may be spot welded or otherwise secured to the body of the sled. Conveniently these cleats may be formed of short length angle bar and the rear edges of the cleats are closer to the edge of the boat than the forward edges. Similar cleats are placed along the rear edge of the boat, but the ones along the rear edge may be set parallel with the edge. The cleats across the end of the boat are designated 8.

The primary function of the cleats is to form abutments to prevent objects on the sled from sliding or rolling off. Because of the fact that they are disconnected and spaced from one another and are relatively short, they do not substantially interfere with the flexibility of the farm boat. The cleats along the side edges are preferably inclined in the direction shown, as that when the farm boat is moving over loose soil, any earth that tends to come in over the sides of the boat is forced out toward the side edge so that the boat is more or less self-cleaning in this respect.

In the modification shown in Fig. 5, the structure is very much the same, the only difference being that the nose is turned up to a less extent. In this view, 2' designates the sheet metal body of the stone boat, 3' is the upwardly turned edge portion, 4' are gussets and 5' is a reinforcing strip along the exterior forward edge. One or more holes are provided at 6' to which a hauling chain or rigging may be attached. From the standpoint of structure, both forms are much the same, the difference being in curvature of the sheet and shape of the gussets 4 and 4' in the respective figures.

In Fig. 6 the stone boat is illustrated as being loaded with a number of stones, designated X, and the surface of the ground is designated at Y. As shown in this figure, the body of the farm boat adapts itself to the uneven contour of the ground while the cleats or guards along the edge prevent the load from being displaced.

As hereinbefore indicated, the flexibility of the farm boat is highly desirable both from the standpoint of relieving the stresses in the boat itself, thereby making it unnecessary to use heavy reinforcements, and it is also of advantage in preventing the marring or digging up of cultivated fields, roadways, lawns or other places over which it may be necessary to drag a load.

While I have described the invention as being applicable primarily to a hauling apparatus for transporting materials around and about a farm, it having special application to such use, it will be understood that its use is not confined to the purposes indicated and that the device can be made in various sizes and from various materials. It may be dimensioned for use as an amusement device for use, for example, as a beach toy, or for hauling articles over sandy beaches and the like.

While I have illustrated and described certain specific embodiments of my invention, it will be understood that this is by way of illustration, and that various changes and modifications may be made within the contemplation of my invention and under the scope of the following claims.

I claim:

1. A hauling device comprised of flat flexible sheet material having an upturned end portion, bracing means for the upturned end portion only, the body back of said upturned end portion being longitudinally and transversely flexible, and a spaced series of cleats along each edge of the body back of the upturned end portion, the thickness of the body between the cleats being only the thickness of the flexible sheet.

2. A hauling device comprised of flat sheet material having an upturned end portion, bracing means for the upturned end portion, the body back of said upturned end portion being longitudinally and transversely flexible, and a spaced series of cleats along each edge of the body back of the upturned end portion, the cleats on the two side edges being set diagonally with the forward ends of said cleat being further in from the edges of the body than the rear ends of the cleats.

3. A hauling device comprising an integral flexible sheet body having an upwardly turned forward end portion, means for bracing the said forward end portion, and a series of spaced independent cleats secured in spaced relation to one another along each longitudinal edge of the body, the body between the cleats having a thickness equal only to the thickness of the remainder of the flexible sheet.

4. A farm boat comprising a flexible sheet metal body having an upwardly turned forward end portion, rigid means for holding and bracing only the upturned end portion in such position, the body back of said upwardly turned end portion being transversely and longitudinally flexible, and a spaced series of cleats along each end of the body of the upturned end portions, the body between the cleats having only the thickness of the original metal sheet constituting the body.

LLOYD JONES.

REFERENCES CITED

The following references are of record in the file of this patent:

UNITED STATES PATENTS

| Number | Name | Date |
|---|---|---|
| 355,792 | Shaw | Jan. 11, 1887 |
| 531,937 | Herman | Jan. 1, 1895 |
| 653,658 | Chickering | July 17, 1900 |
| 2,050,548 | Uhren et al. | Aug. 11, 1936 |
| 2,308,699 | Longenecker | Jan. 19, 1943 |